US005524328A

United States Patent [19]
Hardesty

[11] Patent Number: 5,524,328
[45] Date of Patent: Jun. 11, 1996

[54] WORKPIECE HOLDDOWN ASSEMBLY FOR MACHINE TOOLS

[75] Inventor: Michael P. Hardesty, Dale, Ind.

[73] Assignee: Thermwood Corporation, Dale, Ind.

[21] Appl. No.: 282,963

[22] Filed: Jul. 29, 1994

[51] Int. Cl.$^6$ .............. B23Q 3/06; B23B 47/00; B23C 9/00
[52] U.S. Cl. .............. 29/56.5; 83/422; 83/452; 83/940; 144/250.14; 408/95; 409/163; 409/189; 409/197; 451/365
[58] Field of Search .............. 29/56.5, 33 P, 29/1 A, 563; 451/365; 409/163, 197, 189, 202, 212, 903; 144/249 A, 249 R, 242 A, 242 K; 83/422, 707, 708, 451, 940, 452; 408/62, 95, 87, 98, 51, 103

[56] References Cited

U.S. PATENT DOCUMENTS

| 3,495,492 | 2/1970 | Gerber et al. | 83/451 X |
| 3,585,888 | 6/1971 | Wiatt | 83/422 X |
| 3,742,802 | 7/1973 | Maerz | 83/451 |
| 3,789,731 | 2/1974 | Loy | 409/163 X |
| 4,382,728 | 5/1983 | Anderson et al. | 409/903 X |
| 4,610,582 | 9/1986 | Amos et al. | 409/163 |
| 4,764,061 | 8/1988 | Memmel | 144/249 R |
| 4,796,341 | 1/1989 | Kuhn, II | 29/563 X |
| 5,176,190 | 1/1993 | Miyamoto et al. | 144/249 RX |
| 5,230,594 | 7/1993 | Pilkington | 409/197 |
| 5,379,510 | 1/1995 | Berge | 29/564 |

FOREIGN PATENT DOCUMENTS

| 2933909 | 6/1981 | Germany | 83/708 |
| 210394 | 1/1967 | Sweden | 83/422 |

Primary Examiner—William Briggs
Attorney, Agent, or Firm—Lalos & Keegan

[57] ABSTRACT

In a machine tool having a base member, a table supported on the base member, on which a workpiece may be positioned to be machined, and a toolhead assembly supported on the base member, provided with a tool engageable with the workpiece positioned on the table for performing a work function relative thereto wherein the table and the toolhead assembly are displaceable relative to each other along a line of travel, an assembly for holding down a workpiece positioned on the table upon relative displacement of the table and the toolhead assembly along the line of travel generally consisting of at least one upper roller having an axis disposed transversely relative to the line of travel and engageable in rolling contact with an upper surface of a workpiece positioned on the table, a set of lower rollers each having an axis disposed transversely relative to the line of travel and engageable in rolling contact with an undersurface of the table and means supported on the base member and operatively interconnecting the upper and lower rollers for selectively drawing the rollers together into engagement with the workpiece and table therebetween whereby the workpiece will be urged into contact with the table and the rollers will be disposed in rolling contact with the workpiece and the table as the table and toolhead assembly are displaced relative to each other.

29 Claims, 5 Drawing Sheets

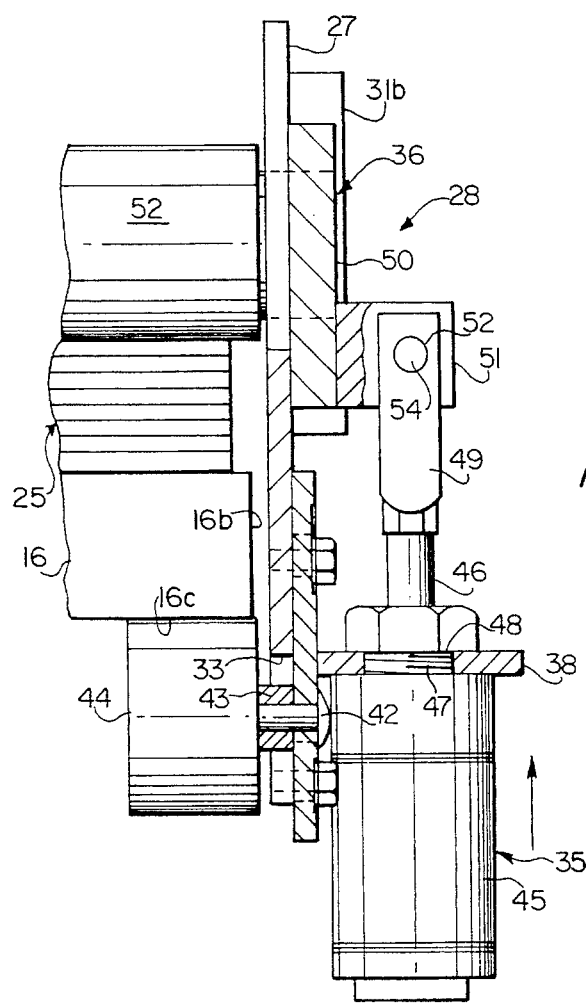
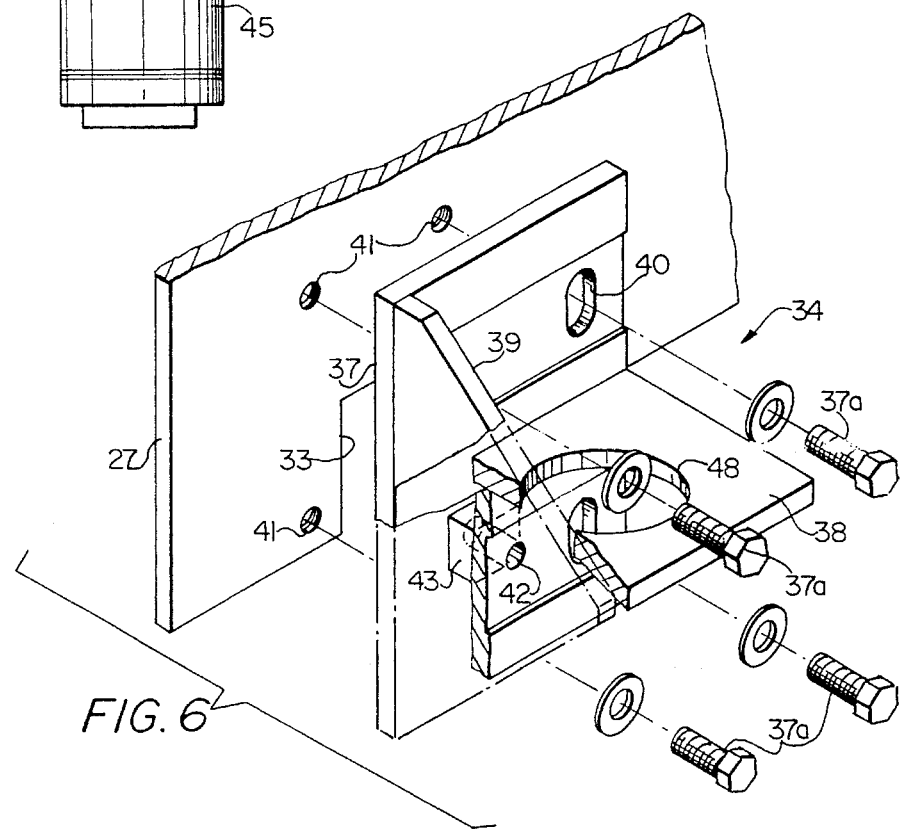

WORKPIECE HOLDDOWN ASSEMBLY FOR MACHINE TOOLS

BACKGROUND OF THE INVENTION

This invention relates to machine tools and more particularly to an assembly for holding workpieces down on worktables of machine tools.

In one type of machine tool used extensively in the woodworking, plastics and aerospace industries, there is provided a base member having a table on which a workpiece may be supported, a bridge or gantry member supported on the base member and adapted to be displaced relative to the base member along a longitudinal line of travel or what is commonly referred to as an x-axis, a toolhead support assembly supported on the bridge member and adapted to be displaced relative to the bridge member along a transverse line of travel or what is commonly referred to as the y-axis, and a toolhead assembly having one or more tools mounted thereon and engageable with a workpiece positioned on the table, supported on the toolhead support assembly and adapted to be displaced along a vertical line of travel or what is commonly referred to as the z-axis. In a modified form of such machines, the table portion of the machine is mounted on the base member for displacement relative to the base member along the x-axis, and the bridge is stationary so that workpieces positioned on the table are displaced along the x-axis into contact with a tool of the toolhead assembly which is adapted to be displaced relative to the stationary bridge member along the y and z-axes.

In either of such types of machines, it is necessary to position such workpieces on the worktable and further to hold them down on the worktable in order to perform the machining function. Typically, positioning means such as pop-up pins have been used to accurately position the workpieces on the worktable and various holddown means such as clamps, vacuum systems and the like have been used to secure the workpieces to the worktables.

In applications where stacks of workpieces are to be machined, and it has been either impractical to use clamping devices or not possible to use vacuum systems for holding down the stack of workpieces, it has been a common practice to use what has been commonly referred to as roller holddown assemblies. Such assemblies commonly have consisted of a set of brackets mounted on a displaceable or stationary bridge or gantry member of the machine, sets of air cylinder assemblies each having their base members rigidly secured on such brackets with upwardly extending rod members, and transversely disposed rollers engageable in rolling contact with an upper one of a stack of workpieces positioned on the worktable, having end portions thereof journaled in bearings provided in the upper ends of the rod members of the air cylinder assemblies. In the use of such holddown assemblies, the rollers are first positioned over a stack of workpieces mounted on the worktable and then the air cylinders are operated to retract the rods thereof and cause the rollers to engage the uppermost one of the stack of workpieces in rolling contact therewith. As the bridge member is displaced relative to a stationary worktable or a worktable is displaced relative to a stationary bridge member, along the z-axis, such rollers will apply a downward force on the stack of workpieces while permitting the workpieces to be displaced relative to the rollers.

Although such holddown assemblies have been effective in holding down a stack of workpieces being machined, it has been found that in the use of such assemblies, the downward force applied by the rollers is transmitted downwardly through the bearings of the tables or bridge members thereof thereby placing undue loads on such bearings resulting in undue wear or premature failure. It thus has been found desirable to provide a holddown assembly generally of the type described which obviates the problem of placing undue loads on the bearings of the tables or bridge members thereof.

Accordingly, it is the principal object of the present invention to provide an improved means for holding down workpieces on a worktable of a machine tool.

Another object of the present invention is to provide an improved means for holding down a stack of workpieces on a worktable of a machine tool.

A further object of the present invention is to provide an improved means for holding down workpieces on a machine tool having either a moveable table or a moveable bridge or gantry member.

A still further object of the present invention is to provide an improved means for holding down workpieces on the table of a machine having a moveable table or a moveable bridge or gantry supporting a toolhead assembly of the type utilizing a set of rollers engaging an uppermost one of a stack of workpieces in rolling contact therewith.

Another object of the present invention is to provide an improved assembly for holding down a stack of workpieces on the table of a machine provided with either a moveable table or a moveable bridge or gantry member in which the application of undue loads on the bearings of such tables or bridge or gantry members is avoided.

A further object of the present invention is to provide a roller type of workpiece holddown assembly for a machine tool utilizing a moveable table or a moveable bridge or gantry member which is simple in design, comparatively inexpensive to manufacture and service and highly effective in performance.

Other objects and advantages of the present invention will become more apparent to those persons having ordinary skill in the art to which the present invention pertains from the following description taken in conjunction with the accompanying drawings wherein:

BRIEF DESCRIPTION OF THE DRAWINGS

FIG. 5 is a view similar to the view shown in FIGS. 3 and 4, illustrating the assembly in a fully operative condition;

FIG. 6 is a perspective view of a portion of the holddown assembly shown in FIGS. 1 through 5, illustrating the components thereof in exploded relation and having portions thereof broken away.

DETAILED DESCRIPTION

Figure 1:
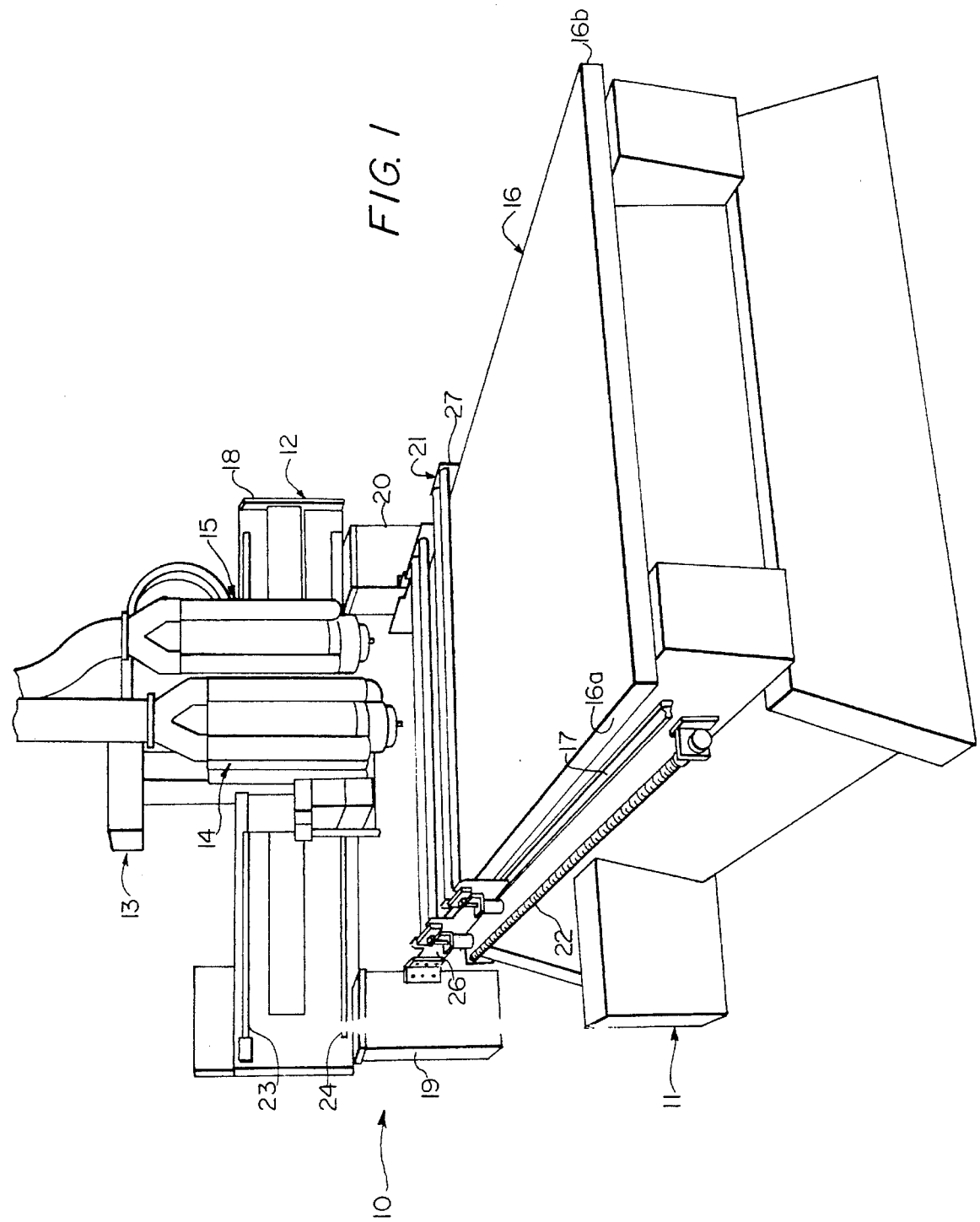
FIG. 1 is a perspective view of a machine tool provided with a workpiece holddown assembly embodying the present invention.

Referring to FIG. 1, there is illustrated a router machine 10 which is adapted to be operated by a controller operatively connected to the machine for displacing a tool of the machine along a longitudinal line of travel or x-axis, a transverse line of travel or y-axis and along a vertical line of travel or z-axis in accordance with a program inputted or loaded into the controller to perform a work function on one or more workpieces positioned on the machine. The machine generally includes a base member 11, a bridge or gantry member 12, a toolhead support assembly 13 and a pair of toolhead assemblies 14 and 15. The base member is provided with a table 16 rigidly mounted on the base member and a pair of trackways 17, 17 mounted on the sides of the base member and disposed parallel to the x-axis of the machine. The table is adapted to support one or more or a stack of workpieces to be machined.

Bridge member 12 includes a transversely disposed beam section 18 spaced above table 16 and spanning the base member, a pair of transversely spaced, depending leg sections 19 and 20 flank the sides of the base member and mounted on trackways 17, 17 for displacement relative to the base member along the x-axis, and a workpiece holddown system 21 mounted on leg sections 19 and 20. The bridge member is displaced relative to the base member along the x-axis by means of a pair of drive screw assemblies 22, 22 mounted on the side portions of the base member and operatively interconnected to leg sections 20 and 21 of the bridge member.

Toolhead support assembly 13 is supported on and guided along a pair of transversely disposed, vertically spaced trackways 23 and 24 disposed on a front wall portion of transverse beam section 18, and is displaced along the y-axis by a drive screw mechanism operatively interconnecting the bridge member and the toolhead support assembly. Each of the toolhead assemblies is supported and displaceable vertically along trackways mounted on support assembly 13 and is adapted to be displaced by a drive screw mechanism operatively interconnecting the support assembly and the toolhead assembly. Each of the toolhead assemblies further is provided with a depending tool such as a router, drill, sanding wheel and the like adapted to be brought into contact with one or more workpieces mounted on table 16 to perform various work functions such as routing, drilling, sanding and the like in accordance with the program inputted or loaded into the controller.

Figure 2:
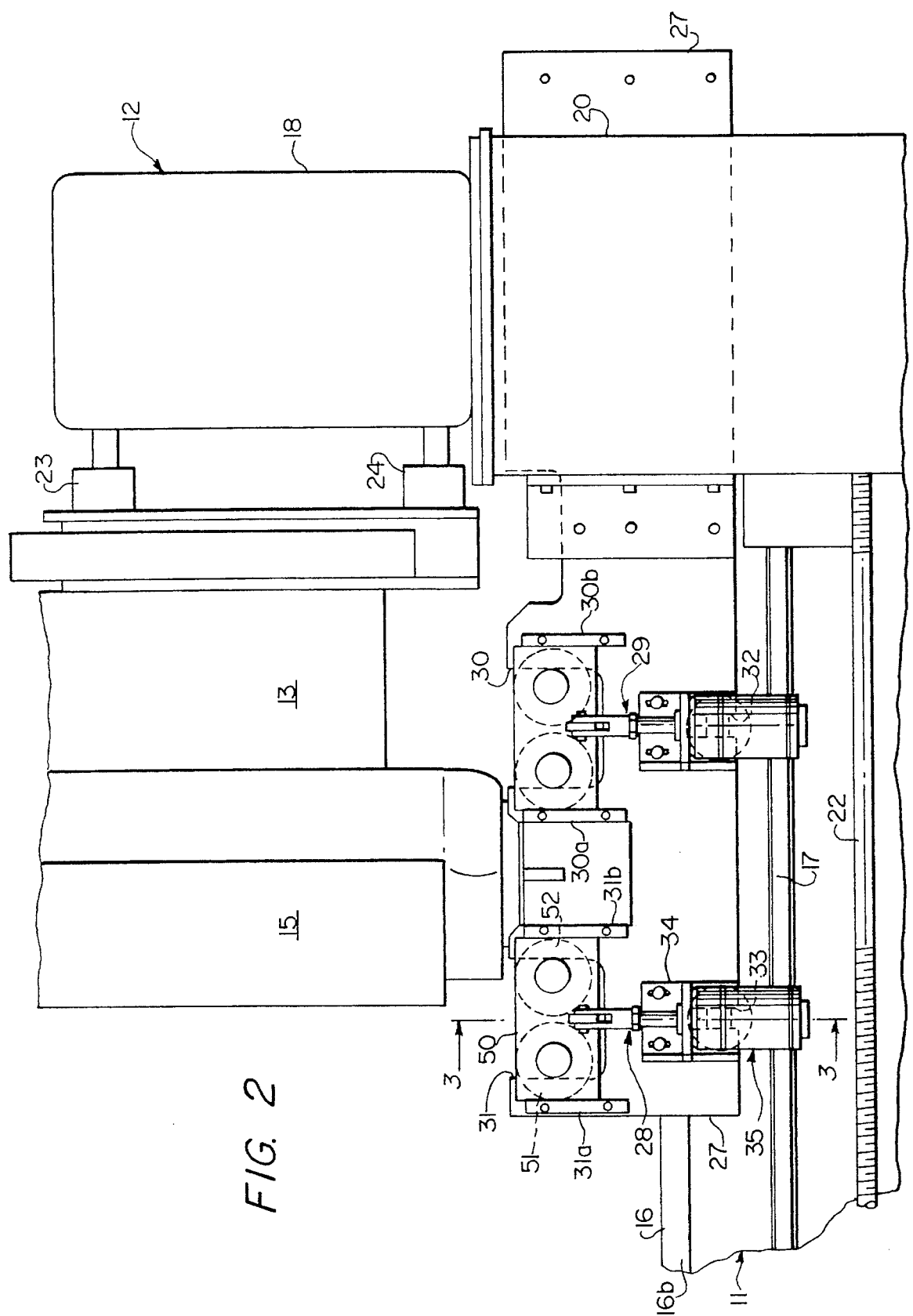
FIG. 2 is an enlarged side view of the holddown assembly shown in FIG. 1, having portions thereof broken away.
Figure 3:
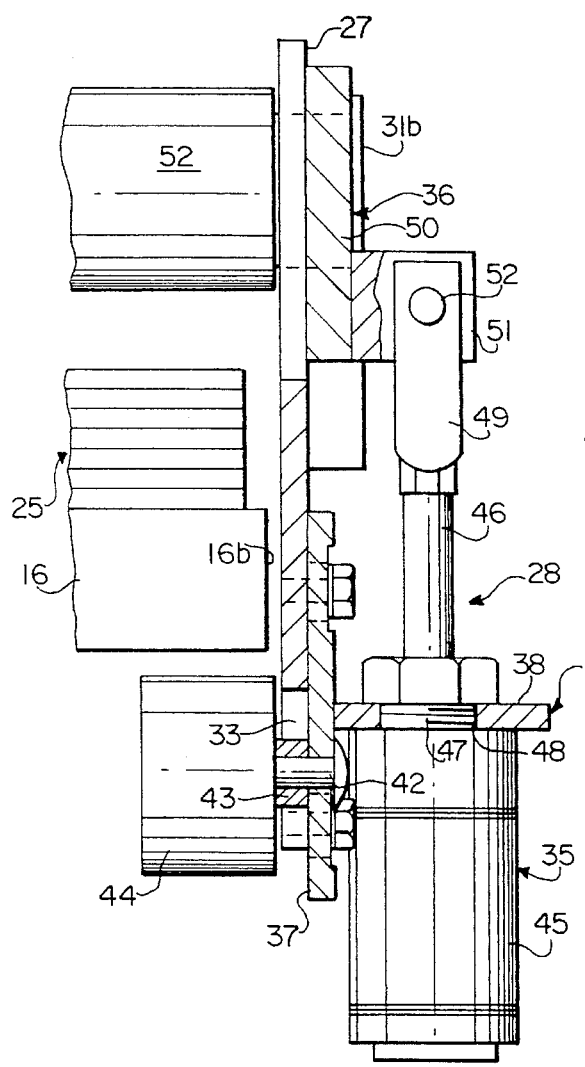
FIG. 3 is an enlarged cross-sectional view taken along line 3—3 in FIG. 2, illustrating a portion of the holddown assembly in an inoperative condition.
Figure 4:
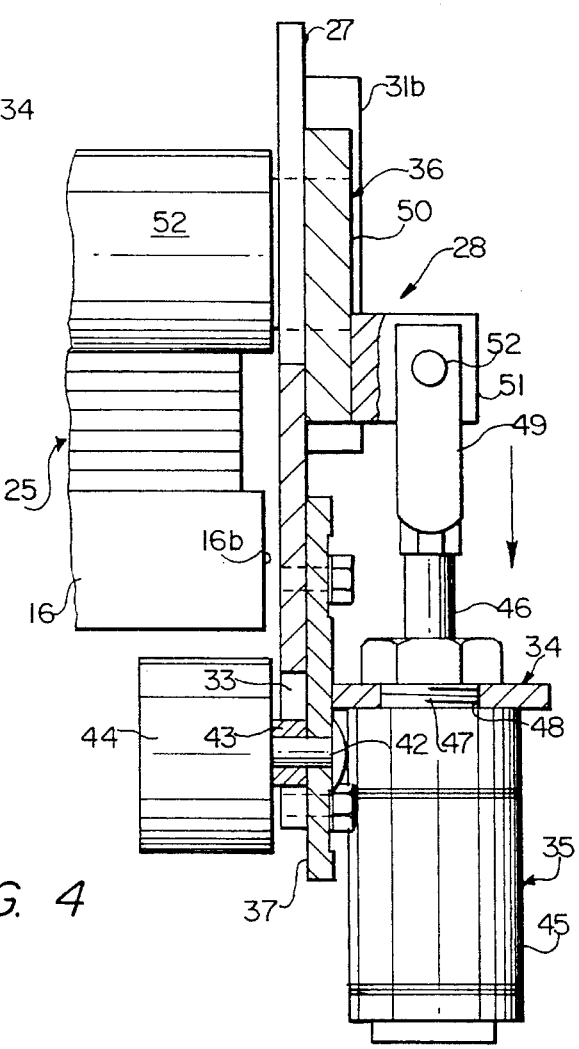
FIG. 4 is a view similar to the view shown in FIG. 3, illustrating the assembly in a partially operative condition.

Holddown assembly 21 is rigidly secured to and displaceable with the bridge member along the x-axis, and cooperates with table 16 to hold down a stack of workpieces 25 on table 16, as best shown in FIGS. 3 through 5. The assembly includes a pair of identically configured support plates 26 and 27 and identically configured roller subassemblies 28 and 29, as best shown in FIGS. 1 and 2. Support plate 26 is disposed longitudinally between leg section 19 and an outer edge 16a of table 16, and is secured at a rear end thereof to forward and inner sides of leg section 19. Support plate 27 similarly is disposed longitudinally between leg section 20 and an outer edge 16b of table 16, and is secured to forward and inner sides of leg section 20 by means of a set of bolts. As the bridge member is displaced along the x-axis, support plates 26 and 27 correspondingly will be caused to displace along the table in spaced relation to table side edges 16a and 16b.

As best shown in FIG. 2, support plate 27 is provided with a first cut-out portion 30 in the upper edge thereof, and a pair of vertically disposed guide bars 30a and 30b secured to the outer surface of the support plate in spaced relation to vertical side edges of the cut-out portion 30 and a second cut-out portion 31 and a pair of vertically disposed guide bars 31a and 31b mounted on the outer side of the support plate and spaced from the side edges of cut-out portion 31. Support plate 27 further is provided with vertical guide slots 32 and 33 in the lower edge of the support plate. Guide slot 32 and cut-out portion 30 have the same vertical center line, and guide slot 33 and cut out portion 31 also have the same vertical center line.

Support plate 26 is provided with a pair of cut out portions similar to and aligned transversely with cut out portions 30 and 31, sets of vertically disposed guide bars comparable to and transversely aligned with guide bars 30a, 30b, 30a and 30b and a pair of vertical slots in the lower edge thereof transversely aligned with guide slots 32 and 33.

Roller subassemblies 28 and 29 are substantially similar in construction and function. As best shown in FIGS. 2 through 6, subassembly 28 includes a lower roller assembly 34 supported on support plate 17, an air cylinder assembly 35 supported on the lower roller assembly and an upper roller assembly 36 supported on the upper end of the air cylinder assembly. Lower roller assembly 34 includes a vertical, longitudinally disposed plate section 37, a horizontally disposed, transversely projecting plate section 38 and a vertically disposed, transversely projecting reinforcing plate section 39. Plate section 37 is positioned on the outer side of support plate 27 and is supported on the support plate and permitted to displace vertically relative to the support plate by means of a set of bolts 37a which extend through vertically enlarged holes 40 in plate section 37 and are threaded into threaded openings 41 provided in support plate 27. The lower portion of plate section 37 is provided with an inwardly projecting stub shaft 42 provided with a spacer element 43 received within and adapted to be displaced vertically in vertical guide slot 33, and a lower roller 44 mounted on the end of the stub shaft 42 and engageable in rolling contact with an undersurface 16c along side edge 16b of the worktable when the bridge member with the holddown assembly is displaced relative to the table along the x-axis.

Air cylinder assembly 35 is of a conventional construction and includes a cylinder member 45 and a rod member 46. The upper end of cylinder member 45 includes an externally threaded portion 47 which extends through an opening 48 in plate section 38 of assembly 34. A nut, receiving rod member 46 therethrough, is threaded onto threaded portion 47 and secured to plate section 38 so that the cylinder member of assembly 35 will be firmly secured to and moved with lower roller section 34. The upper end of rod member 46 is formed with a clevis portion 49 for securing the upper end of the rod section to the upper roller assembly.

Upper roller assembly 36 includes a pair of support plates 50, 50 and a pair of upper rollers 51 and 52 having reduced shaft portions on the end thereof journaled in support plates 50, 50. As shown in FIGS. 2 and 3, one of support plates 50 is received within and guided vertically within vertical guide bars 31a and 31b, and is provided with a laterally projecting lug 51 which is received within and connected to clevis 49 by means of a pin 52. The opposite ends of rollers 51 and 52 similarly are provided with reduced shaft portion journaled in a support plate 50 guided vertically within a pair of spaced guide bars and having a lug connected to the rod member of an air cylinder assembly comparable to air cylinder assembly 35. Each of rollers 51 and 52 is adapted to engage an uppermost workpiece of a stack of workpieces positioned on table 16. Both upper rollers 51 and 52 and lower rollers 44 consist of solid steel cylindrical members provided with reduced end portions journaled in the support plates 50 and plate section 37, having an outer layer of a cushioning material, preferably a urethane material.

In the operation of the machine shown in FIG. 1, with the holddown system in the inoperative condition as shown in FIG. 3, a stack of workpieces 25 is positioned on worktable 16. The machine is then operated to displace the bridge member along the x-axis to position the upper rollers over the workpieces. With the upper rollers thus positioned, the air cylinders are actuated to cause the rod member of the air cylinders to retract and the upper rollers to engage the uppermost one of the stack of workpieces, as shown in FIG. 4, and then to cause the cylinder member of the cylinder assembly and support assembly 34 to move upwardly so that the lower rollers will engage the undersides of table 16, as shown in FIG. 5. As additional pressure is applied by the air cylinder assemblies, the upper rollers will firmly clamp the stack of workpieces on the worktable. The machine is then in condition to execute the selected machining operation. As the bridge member is displaced along the x-axis in executing the operational instructions generated by the controller, the force applied by the air cylinders will cause the upper rollers to continue to engage the workpiece in rolling contact to maintain them in position for the work function being performed on them by the machine. When the machining operation has been completed and the bridge has been returned to the home position, the air cylinders may be operated to extend the rod member thereof and thus displace the upper rollers out of engagement with the workpieces to free them for removal from the table of the machine.

With the type of holddown assembly as described, it will be appreciated that the assembly provides for not only holding down a stack of workpieces but also for preventing any undue forces being applied by the cylinder assemblies to the bearings of the bridge member. By applying the clamping force through the upper and lower rollers to the interposed table and stack of workpieces, the transmission of the clamping forces through the bearings of the bridge member is avoided.

Figure 7:
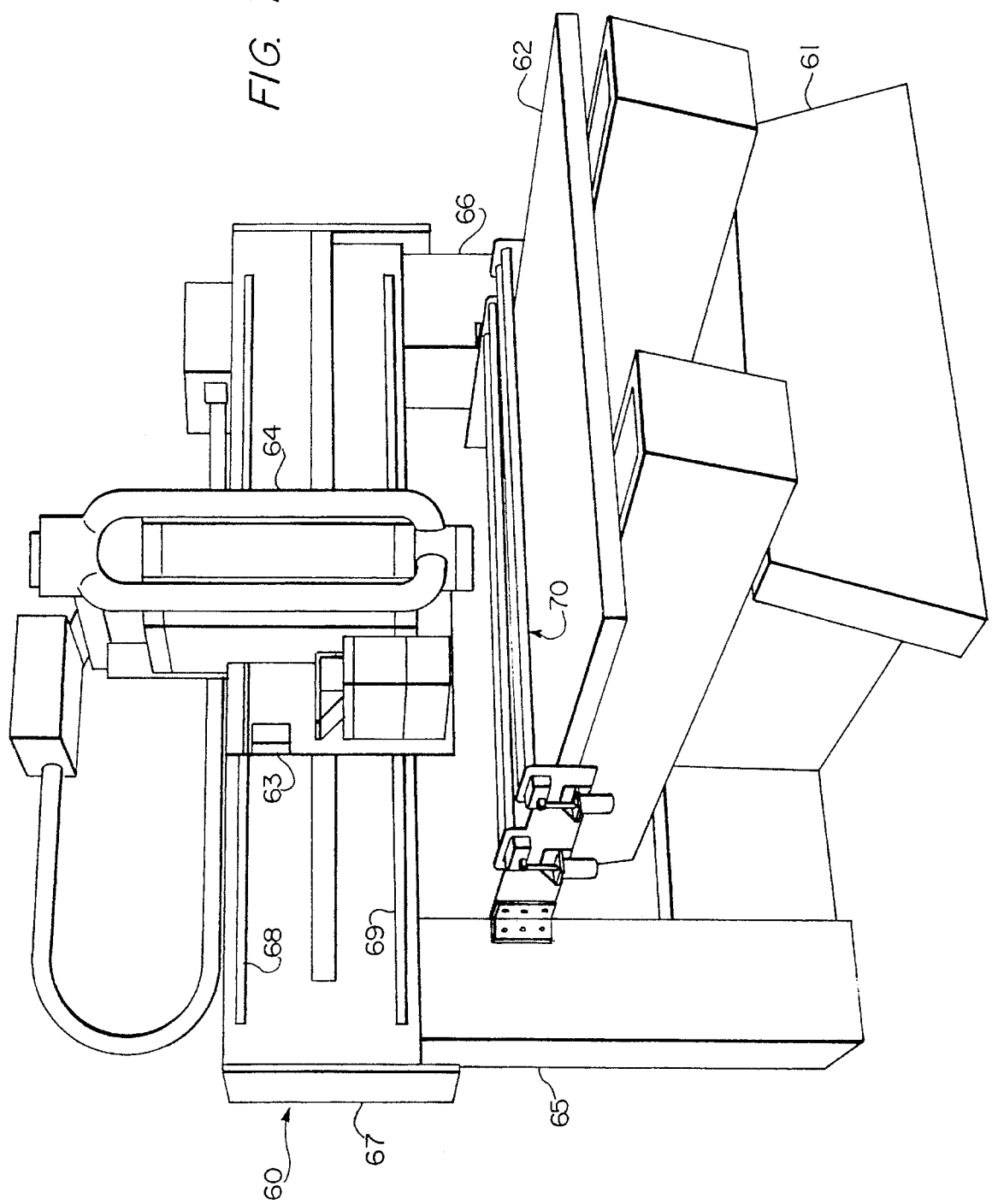
FIG. 7 is a perspective view of a modified version of the machine shown in FIG. 1, utilizing a moveable table and a stationary bridge member.

Referring to FIG. 7, there is shown a routing machine 60 which is a modification of the machine shown in FIG. 1 and with which the invention essentially as described may be used. The machine includes a base member 61, a moveable table 62 mounted on the base member and displaceable along the x-axis, a toolhead support assembly 63 displaceable about the x-axis and a toolhead assembly 64 displaceable along the z-axis. Moveable table 62 is supported on trackways provided on the base member and is adapted to support one or more workpieces to be machined. Base member 61 is provided with a pair of upstanding sections 65 and 66 flanking the table and a cross beam section 67. The cross beam section is provided with a pair of transversely disposed, vertically spaced trackways 68 and 69 which support toolhead support assembly 63 and along which such assembly may be displaced.

Rigidly mounted on upstanding base sections 65 and 66 and cooperable with one or more workpieces positioned on moveable table 62 is a workpiece holddown assembly 70 which is comparable in construction and operation to holddown assembly 21 described in connection with the machine shown in FIGS. 1 through 6. The only differences between the two holddown assemblies is that holddown assembly 27 is mounted on a moveable bridge member and cooperates with one or more workpieces positioned on a stationary table and holddown assembly 70 is mounted on stationary sections of the base member and cooperates with one or more workpieces positioned on a moveable table. In both embodiments, the upper end lower rollers of the holddown assemblies engage the workpieces and underside of the worktable as the bridge member on which the holddown assembly is mounted is displaced relative to the worktable.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a machine tool having a base member, a table supported on said base member, on which at least one workpiece may be positioned to be machined, and a toolhead assembly supported on said base member, provided with a tool engageable with at least one workpiece positioned on said table for performing a work function relative thereto, wherein said table and said toolhead assembly are displaceable relative to each other along a line of travel, an assembly for holding down at least one workpiece positioned on said table upon relative displacement of said table and said toolhead assembly relative to each other along said line of travel comprising:

at least one upper roller having an axis disposed transversely relative to said line of travel and engageable in rolling contact with an upper surface of a workpiece positioned on said table;

a set of lower rollers each having an axis disposed transversely relative to said line of travel and engageable in rolling contact with an undersurface of said table; and means supported on said base member and operatively interconnecting said upper and lower rollers for selectively drawing said rollers together into engagement with said workpiece and table whereby said workpiece will be urged onto said table and said rollers will be disposed in rolling contact with said workpiece and said table as said table and toolhead assembly are displaced relative to each other along said line of travel.

2. An assembly according to claim 1 wherein said upper roller spans the width of said table.

3. An assembly according to claim 1 wherein said lower rollers are engageable with side portions of the undersides of said table.

4. An assembly according to claim 1 wherein said upper roller is provided with an outer surface layer of a cushioning material engageable with said workpiece.

5. An assembly according to claim 1 wherein said upper roller is provided with an outer surface layer consisting of a urethane material engageable with said workpiece.

6. An assembly according to claim 1 wherein said means for drawing said rollers together is, vertically displaceable relative to said base member.

7. An assembly according to claim 1 wherein said means for drawing said rollers together comprise fluid actuated cylinder assemblies each having a base member thereof operatively connected to a shaft portion of one of said upper and lower rollers and a rod member operatively connected to a shaft portion of the other of said upper and lower rollers.

8. In a machine tool having a base member, a table rigidly mounted on said base member on which at least one workpiece may be positioned to be machined, and a toolhead assembly mounted on said base member, having a tool engageable with at least one workpiece positioned on said table for performing work functions relative to said workpiece and displaceable along a line of travel relative to said table, an assembly for holding down a workpiece positioned on said table upon displacement of said toolhead assembly along said line of travel comprising:

at least one upper roller having an axis disposed transversely relative to said line of travel and engageable in rolling contact with an upper surface of a workpiece positioned on said table;

a set of lower rollers each having an axis disposed transversely relative to said line of travel and engageable in rolling contact with an undersurface of said table; and means supported on said base member, displaceable with said toolhead and operatively interconnecting said upper and lower rollers for selectively drawing said rollers together into engagement with said workpiece and table whereby said workpiece will be urged into contact with said table and said rollers will be disposed in rolling contact with said workpiece and table as said toolhead is displaced relative to said table.

9. An assembly according to claim 8 including support plates mounted on a support member mounted on said base member, displaceable along said line of travel and supporting said toolhead assembly, and wherein said rollers and said means for drawing said rollers together into engagement with said workpiece and table, are mounted on said support plates.

10. An assembly according to claim 9 wherein said support member includes a transverse section spaced from said table and a pair of leg sections flanking said base member and supported thereon, and wherein said support plates are secured to said leg sections.

11. An assembly according to claim 8 wherein said upper roller spans the width of said table.

12. An assembly according to claim 8 including at least two upper rollers and at least two lower rollers each engageable with a side undersurface of said table.

13. An assembly according to claim 8 wherein said lower rollers are engageable with undersurfaces of said table disposed along side edges thereof.

14. An assembly according to claim 8 wherein said upper roller is provided with a surface layer consisting of a cushioning material.

15. An assembly according to claim 8 wherein said upper roller is provided with a surface layer consisting of a urethane material engageable with said workpiece.

16. An assembly according to claim 8 wherein said means for drawing said rollers together are supported on said support plates and are displaceable relative thereto.

17. An assembly according to claim 8 wherein said means for drawing said rollers together comprises at least two fluid actuated cylinder assemblies each having a base member thereof operatively connected to a shaft portion of one of said upper and lower rollers and a rod member operatively connected to a shaft portion of the other of said upper and lower rollers.

18. In a machine tool having a base member, a table rigidly mounted on said base member on which a workpiece may be positioned to be machined, a bridge member including a transversely disposed section spaced from said table and a pair of depending leg sections supported on said base member, displaceable relative to said base member along a line of travel and a toolhead assembly mounted on said transversely disposed section of said bridge member, having a tool engageable with a workpiece positioned on said table for performing a work function relative to said workpiece, an assembly for holding down at least one workpiece positioned on said table upon displacement of said bridge member along said line of travel comprising:

a pair of support plates each mounted on a leg section of said bridge member and extending substantially parallel to said line of travel;

a pair of fluid actuated cylinders each having a cylinder member supported on a support plate and displaceable relative thereto, and a rod member;

a transversely disposed upper roller spanning said table and having end portions journaled in bearings supported on the upper ends of said rod members and an intermediate portion engageable in rolling contact with a workpiece positioned on said worktable as said bridge member is displaced along said line of travel; and a lower roller mounted on each of said cylinder members and displaceable therewith relative to said support plate, engageable in rolling contact with an undersurface of said table when said bridge member is displaced along said line of travel.

19. In a machine tool having a base member, a table for supporting thereon at least one workpiece to be machined, mounted on said base member and displaceable along a line of travel, and a toolhead assembly mounted on said base member having a tool engageable with a workpiece positioned on said table for performing a work function relative to said workpiece, an assembly for holding down a workpiece positioned on said table upon displacement of said table along said line of travel comprising;

at least one upper roller having an axis disposed transversely relative to said line of travel and engageable in rolling contact with an upper surface of a workpiece positioned on said table;

a set of lower rollers each having an axis disposed transversely relative to said line of travel and engageable in rolling contact with an undersurface of said table; and means supported on said base member operatively interconnecting said upper and lower rollers for selectively drawing said rollers together into engagement with said workpiece and table therebetween whereby said workpieces will be urged in contact with said table and said rollers will be disposed in rolling contact with said workpiece and said table when said table is displaced relative to said toolhead assembly.

20. An assembly according to claim 19 including support plates mounted on said base member, and wherein said rollers and said means for drawing said rollers together into engagement with said workpiece and table therebetween, are mounted on said support plates.

21. An assembly according to claim 20 wherein said base member includes a transverse section spaced above said table and a pair of leg sections flanking said base member and secured to a main body portion thereof, and wherein said support plates are secured to said leg sections.

22. An assembly according to claim 19 wherein said upper roller spans the width of said table.

23. An assembly according to claim 19 including at least two upper rollers and at least two lower rollers each engageable with a side undersurface of said table.

24. An assembly according to claim 19 wherein said lower rollers are engageable with undersurfaces of said table disposed along side edges thereof.

25. An assembly according to claim 19 wherein said upper roller is provided with a surface layer consisting of a cushioning material.

26. An assembly according to claim 19 wherein said upper roller is provided with a surface layer consisting of a urethane material engageable with said workpiece.

27. An assembly according to claim 19 wherein said means for drawing said rollers together are supported on said support plates and are displaceable relative thereto.

28. An assembly according to claim 19 wherein said means for drawing said rollers together comprise fluid actuated cylinder assemblies.

29. In a machine tool having a base member, a table for supporting thereon at least one workpiece to be machined, mounted on said base member and displaceable along a line of travel relative thereto, a bridge member having a transverse section spaced from said table and a pair of depending leg portions secured to said base portion and a toolhead assembly mounted on the transversely disposed section of said bridge member having a tool engageable with a workpiece positioned on said table for performing work functions relative to said workpiece, an assembly for holding down a workpiece positioned on said table upon displacement of said table along said line of travel comprising:

a pair of support plates each rigidly mounted on a leg section of said bridge member and extending parallel relative to said line of travel;

a fluid actuated cylinder assembly supported on each of said support plates having a cylinder member displaceable relative to said support plate and a rod member;

an upper roller having end portions journaled in bearings provided on said rod members and an intermediate portion engageable with a workpiece positioned on said worktable as said worktable is displaced along said line of travel; and a roller mounted on each of said cylinder members and engageable in rolling contact with an underside of said table along a side edge thereof when said table is displaced along said line of travel.

* * * * *